(12) United States Patent
Manten et al.

(10) Patent No.: US 12,043,000 B2
(45) Date of Patent: Jul. 23, 2024

(54) JOINING THERMOPLASTIC COMPONENTS

(71) Applicant: Rohr, Inc., Chula Vista, CA (US)

(72) Inventors: David Manten, Eemnes (NL); Noushin Bahramshahi, Mission Viejo, CA (US); Lamia Salah, San Diego, CA (US); Dennis Lunenborg, Utrecht (NL); Peter Boer, Renkum (NL); Sarah Lohman, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 112 days.

(21) Appl. No.: 17/715,402

(22) Filed: Apr. 7, 2022

(65) Prior Publication Data
US 2023/0321923 A1   Oct. 12, 2023

(51) Int. Cl.
*B29C 65/18* (2006.01)
*B29C 65/00* (2006.01)
*B29L 31/30* (2006.01)

(52) U.S. Cl.
CPC .......... *B29C 65/18* (2013.01); *B29C 66/0342* (2013.01); *B29C 66/1142* (2013.01);
(Continued)

(58) Field of Classification Search
CPC ........... B29C 66/1142; B29C 66/73921; B29C 66/82; B29C 65/18
(Continued)

(56) References Cited

U.S. PATENT DOCUMENTS 5,078,821 A    1/1992   Garvey
5,362,347 A    11/1994  Domine
(Continued)

FOREIGN PATENT DOCUMENTS

DE    3923785 A1    1/1991
DE    3913723 C2    5/1991
(Continued)

OTHER PUBLICATIONS

Weiss, "Nachtloses Fugen von FV-Strukturen", http://e-collection.ethbib.ethz.ch/ecol-pool/dipl/dipl_248.pdf, May 1, 2006.
(Continued)

*Primary Examiner* — James D Sells
(74) *Attorney, Agent, or Firm* — Getz Balich LLC

(57) ABSTRACT

A joining method is provided during which a first thermoplastic component joint section and a second thermoplastic component joint section are arranged between first tooling and second tooling. The second thermoplastic component joint section is abutted against the first thermoplastic component joint section at a joint area. The first thermoplastic component joint section is joined to the second thermoplastic component joint section to provide a unitized thermoplastic structure. The joining includes: pressing the first thermoplastic component joint section against the second thermoplastic component joint section at the joint area between the first tooling and the second tooling using a pressure device; and heating the first thermoplastic component joint section and the second thermoplastic component joint section at the joint area using a first heater configured with the first tooling. The unitized thermoplastic structure is cooled at the joint area using a first cooler configured with the first tooling.

20 Claims, 15 Drawing Sheets

(52) U.S. Cl.
CPC ........ *B29C 66/73921* (2013.01); *B29C 66/82* (2013.01); *B29L 2031/3076* (2013.01)

(58) Field of Classification Search
USPC .......................................................... 156/311
See application file for complete search history.

(56) References Cited

U.S. PATENT DOCUMENTS

| | | | |
|---|---|---|---|
| 5,376,220 | A | 12/1994 | Campbell |
| 5,462,408 | A | 10/1995 | Coffy |
| 6,675,852 | B2 * | 1/2004 | Calmidi ................. B30B 5/067 156/359 |
| 7,807,093 | B2 | 10/2010 | De Groot |
| 8,383,028 | B2 | 2/2013 | Lyons |
| 8,603,279 | B2 | 12/2013 | Malasse |
| 9,358,764 | B2 | 6/2016 | Prebil |
| 10,576,680 | B2 | 3/2020 | Hills |
| 11,084,228 | B2 | 8/2021 | Salah |
| 2011/0174426 | A1 | 7/2011 | Weimer |
| 2013/0092309 | A1 | 4/2013 | Malasse |
| 2013/0327588 | A1 | 12/2013 | Christenson |
| 2014/0087143 | A1 | 3/2014 | Pacchione |
| 2014/0352877 | A1 | 12/2014 | Fernandez Alonso |
| 2015/0114550 | A1 | 4/2015 | Kurtz |
| 2016/0089836 | A1 | 3/2016 | Shaw |
| 2016/0176102 | A1 | 6/2016 | Silvanus |
| 2016/0375629 | A1 | 12/2016 | Matsen |
| 2017/0043526 | A1 | 2/2017 | Ohki |
| 2017/0043528 | A1 | 2/2017 | Conway |
| 2017/0100901 | A1 | 4/2017 | Del Pinto |
| 2017/0313002 | A1 | 11/2017 | Huang |
| 2018/0133681 | A1 | 5/2018 | Linde |
| 2018/0264756 | A1 | 9/2018 | Giaraffa |
| 2020/0298500 | A1 | 9/2020 | Koehn |

FOREIGN PATENT DOCUMENTS

| | | |
|---|---|---|
| DE | 4033646 C2 | 6/1995 |
| DE | 102016210086 A1 | 12/2017 |

OTHER PUBLICATIONS

EP search report for EP23167082.9 dated Aug. 2, 2023.
Ginger Gardiner, "Hydrostatic Membrane Consolidation: Skin-Stringer Panels in 60 Minutes", CompositesWorld, Mar. 22, 2022.

* cited by examiner

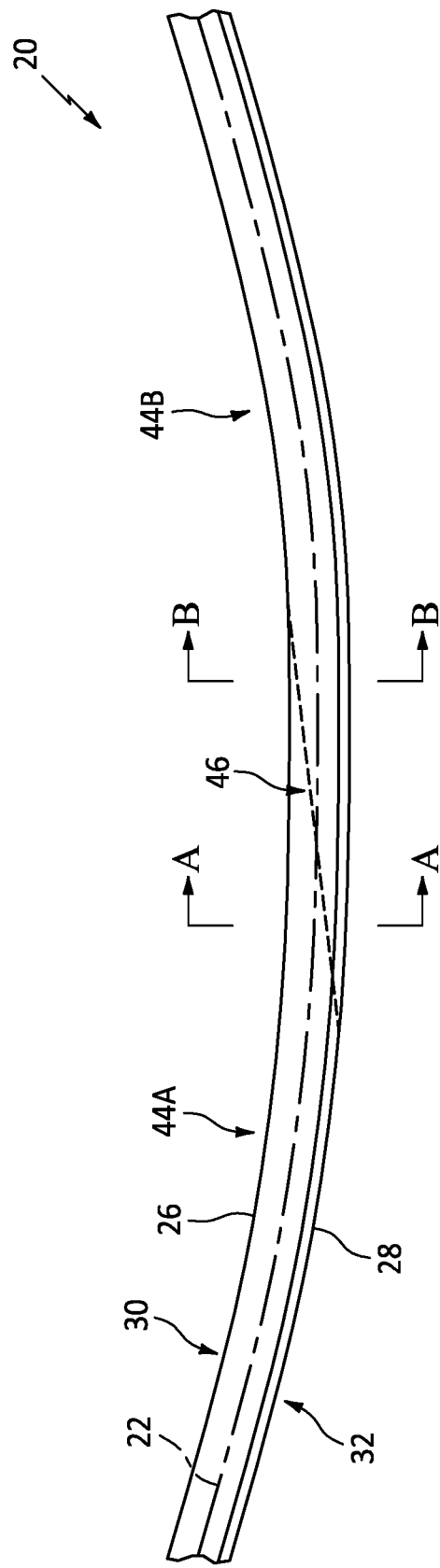
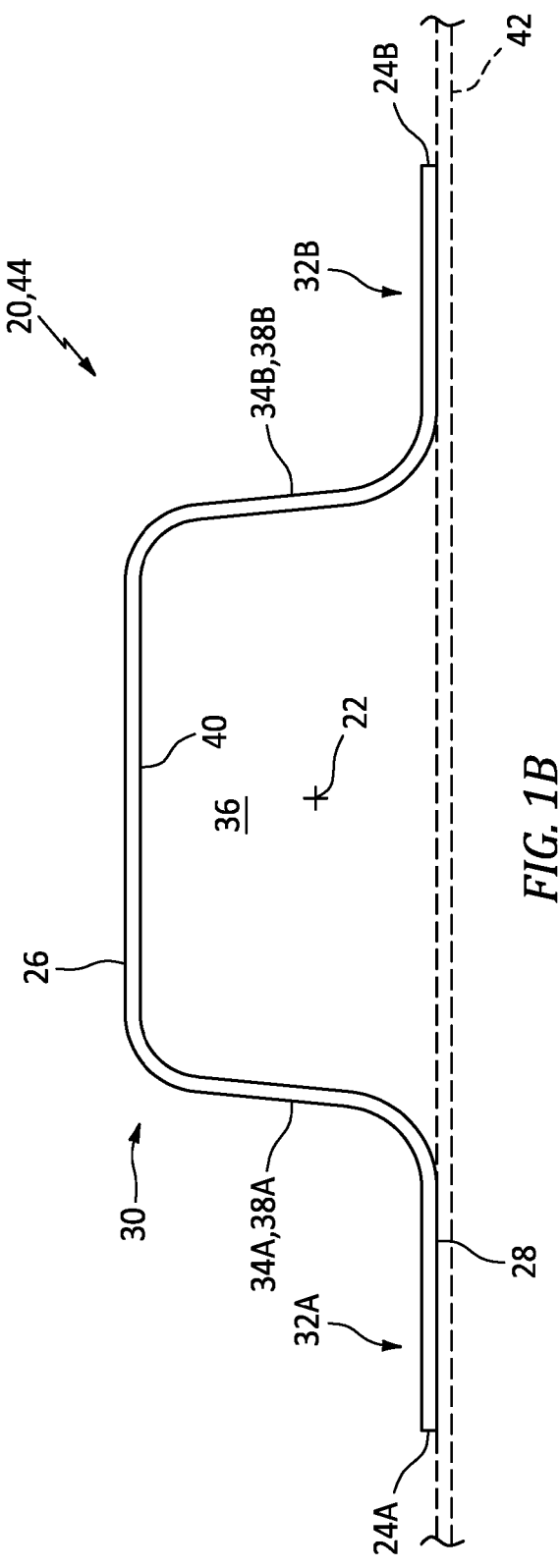
FIG. 1A
FIG. 1B

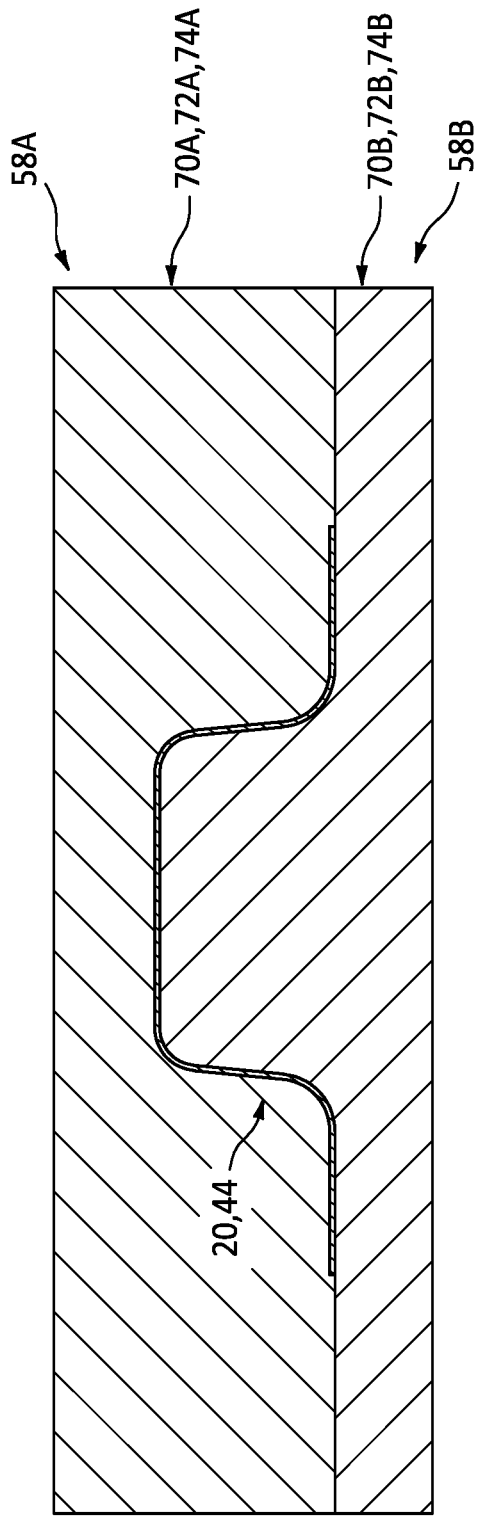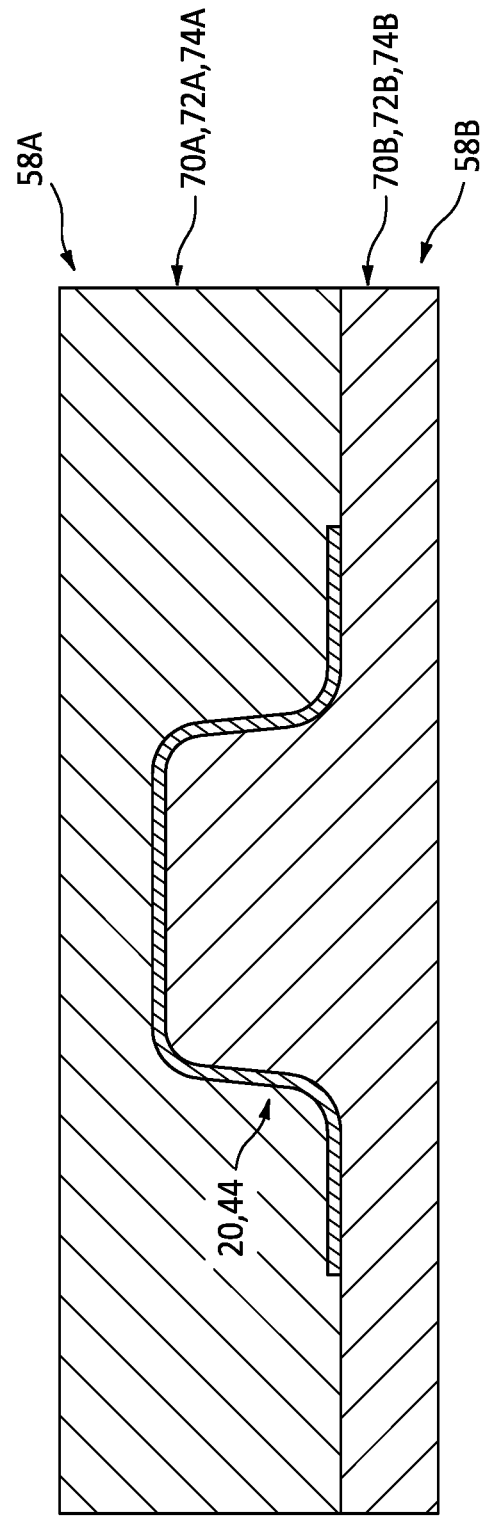

JOINING THERMOPLASTIC COMPONENTS

BACKGROUND

1. Technical Field

This disclosure relates generally to manufacturing and repairing thermoplastic composite structures and, more particularly, to joining thermoplastic components together to form, for example, a complex structure.

2. Background Information

Multiple thermoplastic components may be joined together to form a thermoplastic structure for an aircraft or various other apparatuses. Various systems and welding processes are known in the art for joining thermoplastic components together. While these known systems and processes have various advantages, there is still room in the art for improvement. For example, a thermoplastic joining system may include multiple dies for applying pressure and conductive heating, remelting and reforming the thermoplastic components at a joint during joining. Pressure may be applied using a hydraulic press or any other suitable device. Heat may be applied using electric coils, thermal oil, etc. The dies are typically designed for mating with a specific joint design configuration of the thermoplastic components. The dies therefore may not be used for joining together thermoplastic components with different joint design configurations. Thus, multiple thermoplastic joining systems are required, where each thermoplastic joining system is configured to form a different thermoplastic structure. Designing and manufacturing multiple thermoplastic joining systems and training personnel on these multiple tailored thermoplastic joining systems may be complex, time consuming and expensive. There is a need in art therefore for a single system capable forming various different thermoplastic components. There is also a need in the art for simplified thermoplastic joining systems and methods.

SUMMARY OF THE DISCLOSURE

According to an aspect of the present disclosure, a joining method is provided during which a first thermoplastic component joint section and a second thermoplastic component joint section are arranged between first tooling and second tooling. The second thermoplastic component joint section is abutted against the first thermoplastic component joint section at a joint area. The first thermoplastic component joint section is joined to the second thermoplastic component joint section to provide a unitized thermoplastic structure. The joining includes: pressing the first thermoplastic component joint section against the second thermoplastic component joint section at the joint area between the first tooling and the second tooling using a pressure device; and heating the first thermoplastic component joint section and the second thermoplastic component joint section at the joint area using a first heater configured with the first tooling. The unitized thermoplastic structure is cooled at the joint area using a first cooler configured with the first tooling.

According to another aspect of the present disclosure, a system is provided for joining a first thermoplastic component to a second thermoplastic component. This system includes a pressure device, first tooling and second tooling. The first tooling is configured with a first tooling geometry that conforms to a first side geometry of an assembly of the first thermoplastic component and the second thermoplastic component. The first tooling includes a first heater and a first cooler. The second tooling is configured with a second tooling geometry that conforms to a second side geometry of the assembly. The system is configured to join a first joint section of the first thermoplastic component to a second joint section the second thermoplastic component to provide a unitized thermoplastic structure. During the joining, the system is configured to: press the first joint section of the first thermoplastic component against the second joint section of the second thermoplastic component between the first tooling and the second tooling using the pressure device; and heat the first joint section of the first thermoplastic component and the second joint section of the second thermoplastic component at a joint area using the first heater. The system is also configured to cool the unitized thermoplastic structure using the first cooler.

According to still another aspect of the present disclosure, another method is provided during which a tooling insert is selected from a set of a plurality of different tooling inserts based on a configuration of at least one of a first thermoplastic component and a second thermoplastic component. The tooling insert is mated with a tooling base to provide first tooling. The tooling base is configured with a first heater and a first cooler. A first joint section of the first thermoplastic component and a second joint section of the second thermoplastic component are arranged between the first tooling and second tooling. The second joint section of the second thermoplastic component is abutted against the first joint section of the first thermoplastic component. The first thermoplastic component is joined to the second thermoplastic component to provide a unitized thermoplastic structure. The joining includes: pressing the first joint section of first thermoplastic component against the second joint section of the second thermoplastic component between the tooling insert and the second tooling; and heating the first joint section of first thermoplastic component and the second joint section of the second thermoplastic component using the first heater. The unitized thermoplastic structure is cooled using the first cooler.

The pressure device may be configured as or otherwise include a press. The pressure device may also or alternatively be configured as or otherwise include any other device capable of pressing the thermoplastic component joint sections together.

The first tooling may include a tooling base and a tooling insert. The tooling base may include the first heater and the first cooler. The tooling insert may provide the first tooling with the geometry that conforms to the first side geometry of the assembly. The tooling insert may be configured to be between and contact the tooling base and the assembly.

The first tooling may include a tooling base. The tooling base may include the first heater and the first cooler. The tooling base may provide the first tooling with the geometry that conforms to the first side geometry of the assembly. The tooling base may be configured to be between a member of the pressure device and the assembly. The tooling base may be configured to contact the assembly.

The first heater may be disposed within the first tooling.

The heating may include heating the first thermoplastic component joint section and the second thermoplastic component joint section using a second heater configured with the second tooling.

The first cooler may be disposed within the first tooling.

The cooling may include cooling the thermoplastic structure using a second cooler configured with the second tooling.

The pressure device may include a first press device and a second press device. The first tooling and the second tooling may be arranged between the first press device and the second press device. The first press device may engage the first tooling. The second press device may engage the second tooling.

The first tooling may include a tooling base and a tooling insert. The tooling base may be arranged with the first heater and the first cooler. The tooling insert may have a geometry that conforms to a geometry of an assembly of the first thermoplastic component joint section and the second thermoplastic component joint section. The tooling insert may be between and may contact the tooling base and the assembly.

The first tooling may also include a second tooling base and a second tooling insert. The second tooling base may be adjacent the tooling base. The second tooling insert may be adjacent the tooling insert. The second tooling insert may have a geometry that conforms to a geometry of at least the first thermoplastic component joint section. The second tooling insert may be between and may contact the second tooling base and at least the first thermoplastic component joint section.

The second tooling base may be configured without a heater and/or a cooler.

The second tooling base may be configured with a second heater and/or a second cooler.

The first tooling may include a tooling base. The tooling base may be arranged with the first heater and the first cooler. The tooling base may have a geometry that conforms to a geometry of an assembly of the first thermoplastic component joint section and the second thermoplastic component joint section. The tooling base may be between a member of the pressure device and the assembly. The tooling base may contact the assembly.

The first tooling may also include a second tooling base. The second tooling base may be adjacent the tooling base. The second tooling base may have a geometry that conforms to a geometry of at least the first thermoplastic component joint section. The second tooling base may be between the member of the pressure device and at least the first thermoplastic component joint section. The second tooling base may contact at least the first thermoplastic component joint section.

The second tooling base may be configured without a heater and/or a cooler.

The second tooling base may be configured with a second heater and/or a second cooler.

A cross-sectional geometry of an assembly of the first thermoplastic component joint section and the second thermoplastic component joint section may change as the assembly extends along the first tooling.

A dimension of an assembly of the first thermoplastic component joint section and the second thermoplastic component joint section may change as the assembly extends along the first tooling.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 1A is a side illustration of a portion of a thermoplastic composite structure such as a support member.

FIG. 1B is a cross-sectional illustration of the thermoplastic composite structure.

FIG. 7A is a cross-sectional illustration of a second composite thermoplastic structure between respective top and bottom inserts at a longitudinal position corresponding to line A-A in FIG. 1.

FIG. 7B is a cross-sectional illustration of the second thermoplastic composite structure between respective top and bottom inserts at a longitudinal position corresponding to line B-B in FIG. 1.

DETAILED DESCRIPTION

Figure 2:
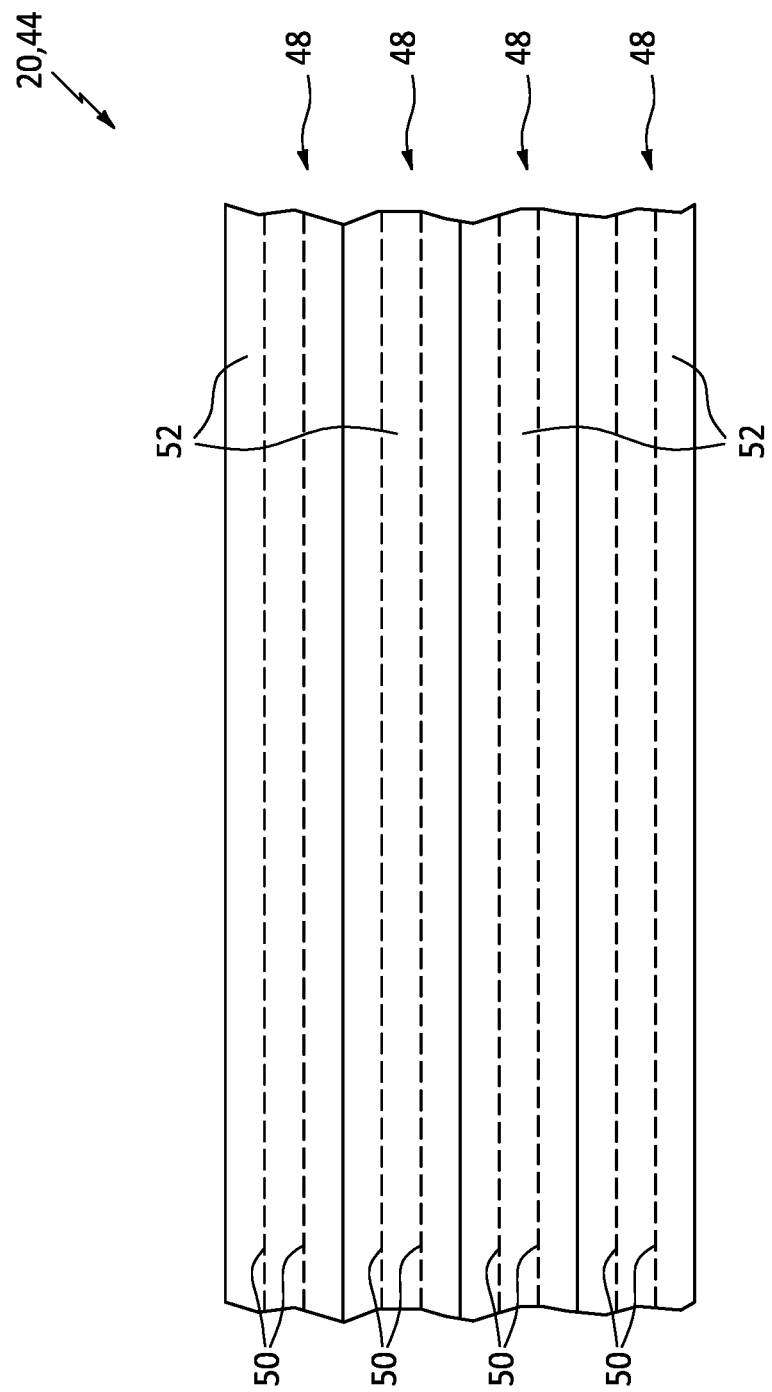
FIG. 2 is sectional illustration of a portion of the thermoplastic composite structure configured with one or more layers.

The present disclosure includes systems and methods for joining joint sections of thermoplastic components together to manufacture, repair or otherwise form a unitized thermoplastic structure. This thermoplastic structure may be configured as part of an aircraft, or other apparatuses. The thermoplastic structure, for example, may be configured as part of a propulsion system for the aircraft. For example, the thermoplastic structure may be configured as or included as part of a component of a nacelle. Examples of the nacelle component include, but not limited to, a fan cowl, an outer barrel, an inner barrel, an inlet lip skin and a translating sleeve. The thermoplastic structure may alternatively be configured as a component of a fuselage or a wing of the aircraft. The thermoplastic structure may still alternatively be configured as a component arranged within the aircraft fuselage; e.g., a component within a cabin of the aircraft. The present disclosure, however, is not limited to the foregoing exemplary aircraft structures. Furthermore, it is contemplated the thermoplastic structure of the present disclosure may also be configured for non-aircraft applications.

For ease of description, the thermoplastic structure may be referred to and/or described below as a support member for an aircraft structure; e.g., the nacelle component. This support member may be configured as a stiffener and/or any other structural member which stiffens, holds, locates and/or otherwise supports one or more other components; e.g., an exterior skin for the nacelle component. Examples of the stiffener include, but are not limited to, a rib, a stringer, a longeron, a beam and a truss. However, for ease of description, the support member may be referred to and/or described below as a stiffener; e.g., a hat shaped stiffener. An exemplary embodiment of this support member 20 is illustrated in FIGS. 1A and 1B.

Referring to FIG. 1A, the support member 20 extends longitudinally along a longitudinal centerline 22 of the support member 20. Referring to FIG. 1B, the support member 20 extends laterally between and to a first side 24A of the support member 20 and a second side 24B of the support member 20. The support member 20 extends vertically between and to an interior side 26 of the support member 20 and an exterior side 28 of the support member 20. The support member 20 of FIGS. 1A and 1B includes a channeled base 30 and one or more mounts 32A and 32B (generally referred to as "32"); e.g., flanges. Referring to FIG. 1A, the channeled base 30 extends longitudinally along the longitudinal centerline 22. Referring to FIG. 1B, the channeled base 30 extends laterally between and to a first side 34A of the channeled base 30 and a second side 34B of the channeled base 30. The channeled base 30 extends vertically between and to (or about) the support interior side 26 and the support exterior side 28. The channeled base 30 is configured with a U-shaped cross-sectional geometry when viewed, for example, in a reference plane perpendicular to the longitudinal centerline 22. This configuration provides the channeled base 30 with a channel 36 that extends longitudinally in (e.g., through) the support member 20 and its channeled base 30. The channel 36 extends laterally in (e.g., within) the support member 20 and its channeled base 30 between opposing sidewalls 38A and 38B (generally referred to as "38") of the channeled base 30. The channel 36 projects vertically into the support member 20 and its channeled base 30 from the support exterior side 28 to an endwall 40 of the channeled base 30.

Each of the mounts 32 is connected to (e.g., formed integral with) the channeled base 30. Each of the mounts 32 is disposed at (e.g., on, adjacent or proximate) the support exterior side 28. Each of the mounts 32A, 32B projects laterally out from a respective one of the base sidewalls 38A, 38B to a distal end of that mount 32. These mounts 32A and 32B project may laterally out from the channeled base 30 and its base sidewalls 38A, 38B in opposite directions and away the channel 36; however, the present disclosure is not limited to such an exemplary mount arrangement. With this arrangement, the mounts 32 may be abutted against and joined (e.g., fused) to another component 42; e.g., the exterior skin for the nacelle component. This joining operation includes remelting and reconsolidating the 3-D joint section where the components come together.

The support member 20 of FIG. 1A is formed from a plurality of discrete joint sections 44A and 44B (generally referred to as "44"), which support member sections 44 are joined together at an interface 46 (e.g., a fused joint within a joint area) to provide the support member 20 with a unitary, integral body. The first section 44A of FIG. 1A, for example, extends longitudinally along the longitudinal centerline 22 in a first longitudinal direction (towards the second section 44B) to the interface 46. The second section 44B of FIG. 1A extends longitudinally along the longitudinal centerline 22 in a second longitudinal direction (opposite the first longitudinal direction; towards the first section 44A) to the interface 46. These support member sections 44 are joined together at the interface 46, where material of first section 44A is fused with material of the second section 44B, for example, without requiring any additional materials; e.g., filler, adhesive, intermediate material, etc.

Referring to FIG. 2, the support member 20 and each of its sections 44 may be constructed from one or more layers 48 of component material. This component material may be a fiber-reinforced thermoplastic composite. Fiber-reinforcement 50, for example, may be embedded within a thermoplastic material 52; e.g., a thermoplastic matrix. Examples of the fiber-reinforcement 50 include, but are not limited to, carbon fibers, fiberglass fibers and aramid fibers. Examples of the thermoplastic material 52 include, but are not limited to, a semi-crystalline thermoplastic resin and an amorphous thermoplastic resin. The present disclosure, however, is not limited to the foregoing exemplary fiber-reinforcement materials or thermoplastic materials.

Figure 3:
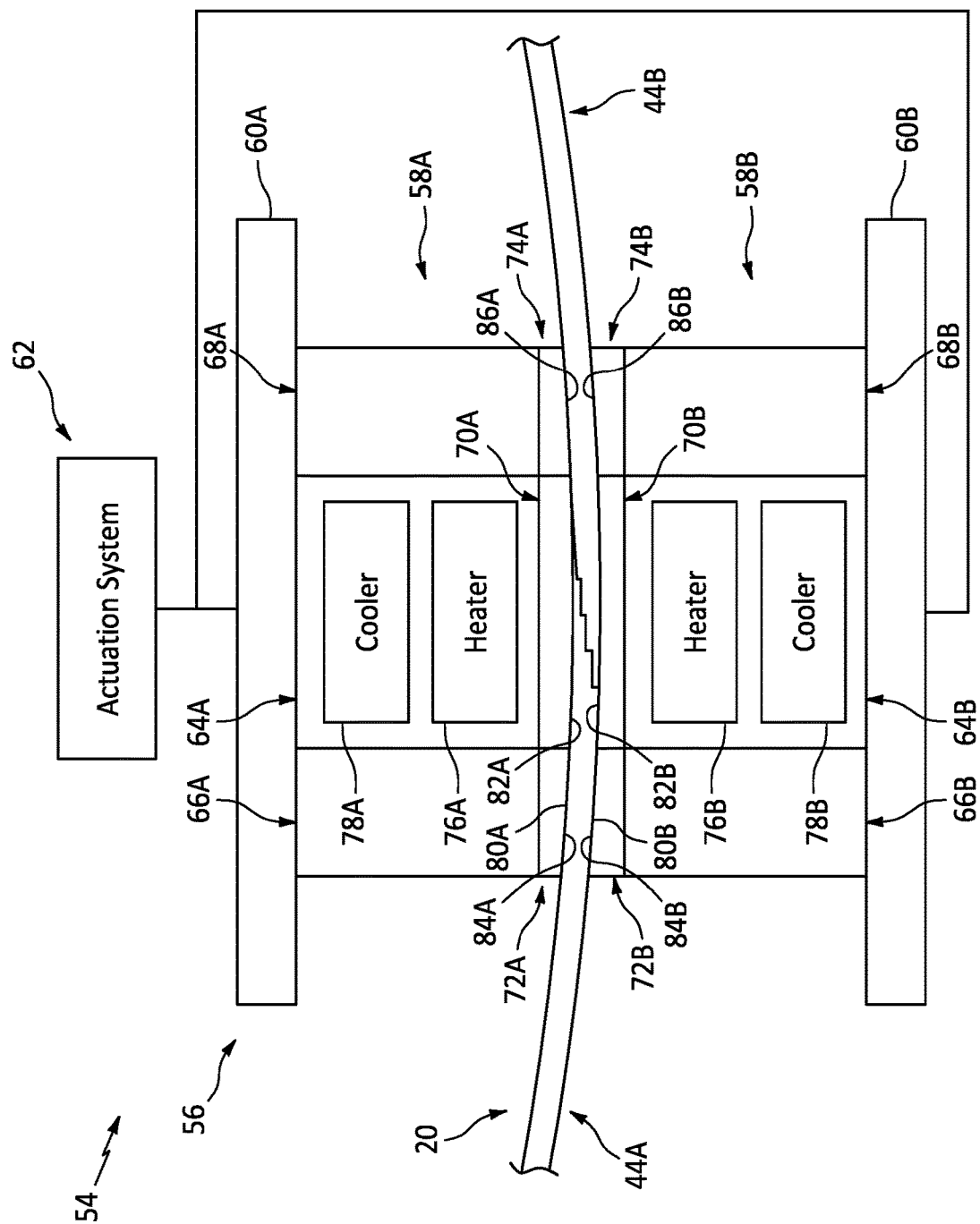
FIG. 3 is a schematic illustration of a system for joining sections of the thermoplastic composite structure together.

FIG. 3 illustrates a system 54 for joining the support member sections 44 (e.g., thermoplastic components) together to manufacture, repair or otherwise form the support member 20 (e.g., a thermoplastic structure) from discrete segments. This joining system 54 includes a pressure device 56, top tooling 58A and bottom tooling 58B. Note, the terms "top" and "bottom" are used herein to describe the relative position of the tooling as well as other components in the drawings. The present disclosure, however, is not limited to such an exemplary arrangement. For example, in other embodiments, the tooling 58A may be below the tooling 58B relative to gravity.

The pressure device 56 may be configured as a mechanical press; e.g., a hydraulic, pneumatic and/or electromechanical press. This pressure device 56 of FIG. 3, for example, includes a top press device 60A (e.g., a press die, press plate) and a bottom press device 60B (e.g., a press die, press plate). The pressure device 56 of FIG. 3 also includes an actuation system 62 configured to move (e.g., translate) the top press device 60A towards the (e.g., stationary) bottom press device 60B, to move the bottom press device 60B towards the (e.g., stationary) top press device 60A, or to move the top press device 60A and the bottom press device 60B towards one another. The present disclosure, however, is not limited to such an exemplary mechanical press. The pressure device 56, for example, may alternatively be configured as a vacuum bag press or any other device capable of pressing the tooling 58 together.

The top tooling 58A includes one or more top tooling bases 64A, 66A and 68A (referred to below as "top bases") and one or more top tooling inserts 70A, 72A and 74A (referred to below as "top inserts"). The intermediate top base 64A is configured as a master base, and each of the side top bases 66A and 68A may be configured as an auxiliary base. The intermediate top base 64A, for example, is configured with an integrated heated and/or cooled top base. The intermediate top base 64A of FIG. 3, for example, includes an internal top heater 76A and/or an internal top cooler 78A. The top heater 76A and the top cooler 78A are arranged within a body of the intermediate top base 64A. Examples of the top heater 76A include an electrical heating element, an induction heater, and a heating circuit for flowing a heated fluid therethrough. An example of the top cooler 78A is a cooling circuit for flowing cooled fluid therethrough. Each of the side top bases 66A and 68A, by contrast, may be configured without a heater and/or a cooler. However, each of the side top bases 66A and 68A may be indirectly heated and/or cooled by the intermediate top base 64A and its top heater 76A and/or its top cooler 78A through conduction.

Figure 4:
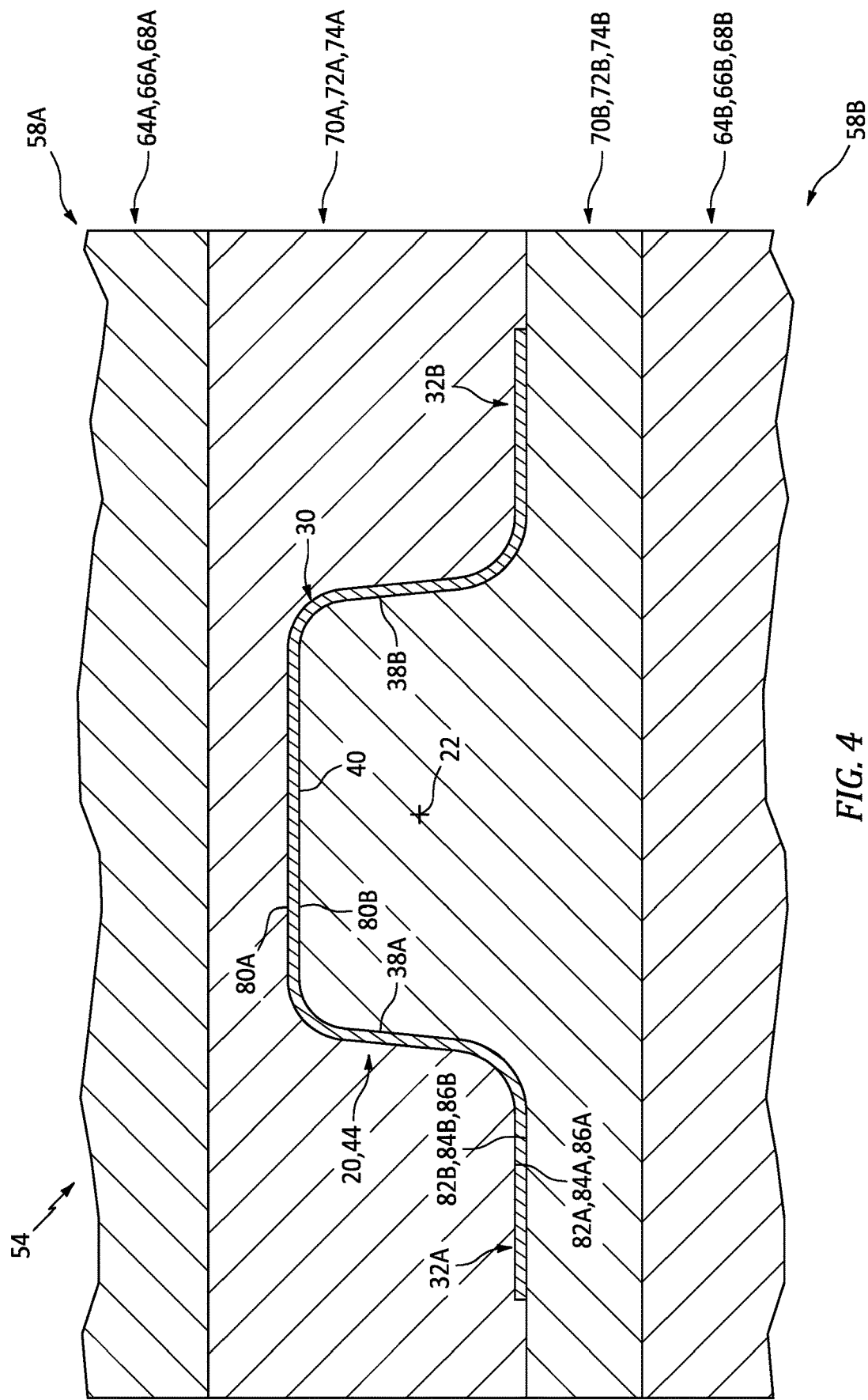
FIG. 4 is a cross-sectional illustration of a portion of the joining system and the thermoplastic composite structure.

The top inserts 70A, 72A and 74A are configured to respectively adapt the top bases 64A, 66A and 68B to a configuration of the thermoplastic components to be joined together. Each of the top inserts 70A, 72A, 74A, for example, is arranged with a respective one of the top bases 64A, 66A, 68A. Each of these top inserts 70A, 72A, 74A has a geometry that conforms to a geometry of a top side 80A of one or more of the support member sections 44. For example, referring to FIG. 4, each top insert 70A, 72A, 74A includes a bottom surface 82A, 84A, 86A configured to engage (e.g., contact, abut, lay flush against, etc.) the top side 80A of one or more of the support member sections 44 (one support member section visible in FIG. 4). The bottom surface 82A, 84A, 86A of FIG. 4, for example, includes a concave portion which extends along and contacts the channeled base 30. The bottom surface 82A, 84A, 86A of FIG. 4 also includes a plurality of (e.g., straight) side portions, where each side portion extends along and contacts a respective one of the mounts 32A, 32B.

Each of the top inserts 70A, 72A, 74A of FIG. 3 may be removably attached to a respective top base 64A, 66A, 68A. With such an arrangement, one or more or all of the top inserts 70A, 72A, 74A may be replaced (e.g., swapped out) such that the top tooling 58A may be mated with thermoplastic components with various different joint design configurations without, for example, requiring replacement (e.g., swapping out) at least one or any of the top bases 64A, 66A, 68A.

To facilitate conduction of heat through the top tooling 58A, one or more or all of the top tooling components 64A, 66A, 68A, 70A, 72A and 74A is constructed from a conductive material. Each of the top tooling components 64A, 66A, 68A, 70A, 72A, 74A, for example, is constructed from metal such as, but not limited to, steel.

The top tooling 58A is arranged with the top press device 60A. Each top base 64A, 66A, 68A of FIG. 3, for example, is arranged (e.g., vertically) between and engaged with (e.g., contacts) a bottom of the top press device 60A and a top of a respective one of the top inserts 70A, 72A, 74A. Each top base 64A, 66A, 68A may also be removably or permanently attached to the top press device 60A.

The bottom tooling 58B includes one or more bottom tooling bases 64B, 66B and 68B (referred to below as "bottom bases") and one or more bottom tooling inserts 70B, 72B and 74B (referred to below as "bottom inserts"). The intermediate bottom base 64B is configured as a master base, and each of the side bottom bases 66B and 68B may be configured as an auxiliary base. The intermediate bottom base 64B, for example, is configured with an integrated heated and/or cooled bottom base. The intermediate bottom base 64B of FIG. 3, for example, includes an internal bottom heater 76B and an internal bottom cooler 78B. The bottom heater 76B and the bottom cooler 78B are arranged within a body of the intermediate bottom base 64B. Examples of the bottom heater 76B include an electrical heating element, an induction heater, and a heating circuit for flowing a heated fluid therethrough. An example of the bottom cooler 78B is a cooling circuit for flowing cooled fluid therethrough. Each of the side bottom bases 66B and 68B, by contrast, may be configured without a heater and/or a cooler. However, each of the side bottom bases 66B, 68B may be indirectly heated and/or cooled by the intermediate bottom base 64B and its bottom heater 76B and/or its bottom cooler 78B through conduction.

The bottom inserts 70B, 72B and 74B are configured to respectively adapt the bottom bases 64B, 66B and 68B to a configuration of the thermoplastic components to be joined together. Each of the bottom inserts 70B, 72B, 74B, for example, is arranged with a respective one of the bottom bases 64B, 66B, 68B. Each of these bottom inserts 70B, 72B, 74B has a geometry that conforms to a geometry of a bottom side 80B of one or more of the support member sections 44. For example, referring to FIG. 4, each bottom insert 70B, 72B, 74B includes a top surface 82B, 84B, 86B configured to engage (e.g., contact, abut, lay flush against, etc.) the bottom side 80B of one or more of the support member sections 44 (one support member section visible in FIG. 4). The top surface 82B, 84B, 86B of FIG. 4, for example, includes a convex portion which extends along and contacts the channeled base 30 with the channel 36. The top surface 82B, 84B, 86B of FIG. 4 also includes a plurality of (e.g., straight) side portions, where each side portion extends along and contacts a respective one of the mounts 32A, 32B.

Each of the bottom inserts 70B, 72B, 74B of FIG. 3 may be removably attached to a respective bottom base 64B, 66B, 68B. With such an arrangement, one or more or all of the bottom inserts 70B, 72B and/or 74B may be replaced (e.g., swapped out) such that the bottom tooling 58B may be mated with thermoplastic components with various different joint design configurations without, for example, requiring replacement (e.g., swapping out) at least one or any of the bottom bases 64B, 66B and/or 68B.

To facilitate conduction of heat through the bottom tooling 58B, one or more or all of the bottom tooling components 64B, 66B, 68B, 70B, 72B and 74B is constructed from a conductive material. Each of the bottom tooling components 64B, 66B, 68B, 70B, 72B, 74B, for example, is constructed from metal such as, but not limited to, steel.

The bottom tooling 58B is arranged with the bottom press device 60B. Each bottom base 64B, 66B, 68B of FIG. 3, for example, is arranged (e.g., vertically) between and engaged with (e.g., contacts) a top of the bottom press device 60B and a bottom of a respective one of the bottom inserts 70B, 72B, 74B. Each bottom base 64B, 66B, 68B may also be removably or permanently attached to the bottom press device 60B.

Figure 5:
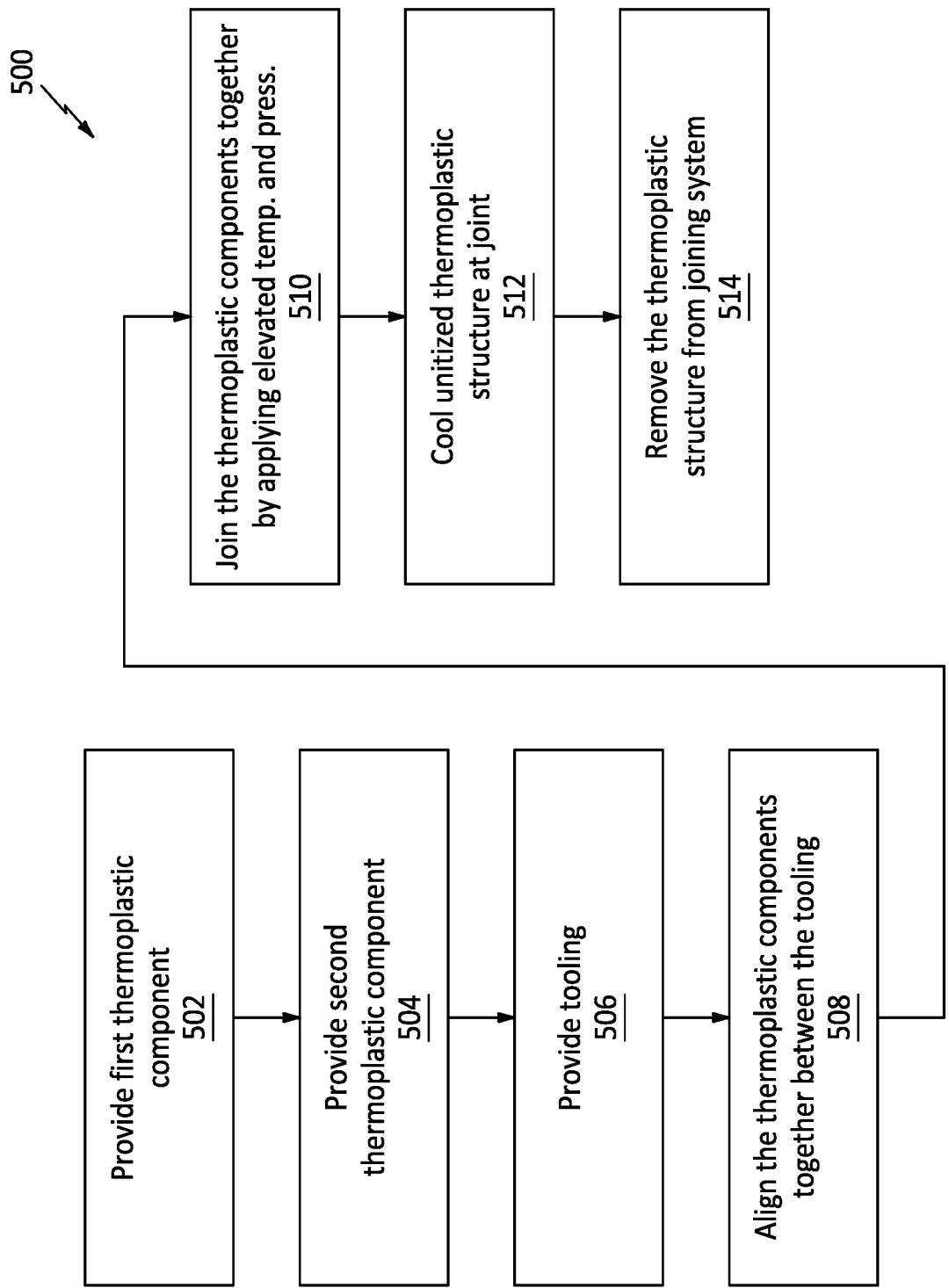
FIG. 5 is a flow diagram of a method for joining the sections of the thermoplastic composite structure together.

FIG. 5 is a flow diagram of a method 500 for manufacturing, repairing or otherwise forming the support member 20 (e.g., a thermoplastic structure). For ease of description, this joining method 500 is described below with reference to the joining system 54 described herein. The joining method 500 of the present disclosure, however, is not limited to using such an exemplary joining system.

In step 502, the first section 44A of the support member 20 (e.g., a first thermoplastic component) is provided.

In step 504, the second section 44B of the support member 20 (e.g., a second thermoplastic component) is provided.

Figure 6A:
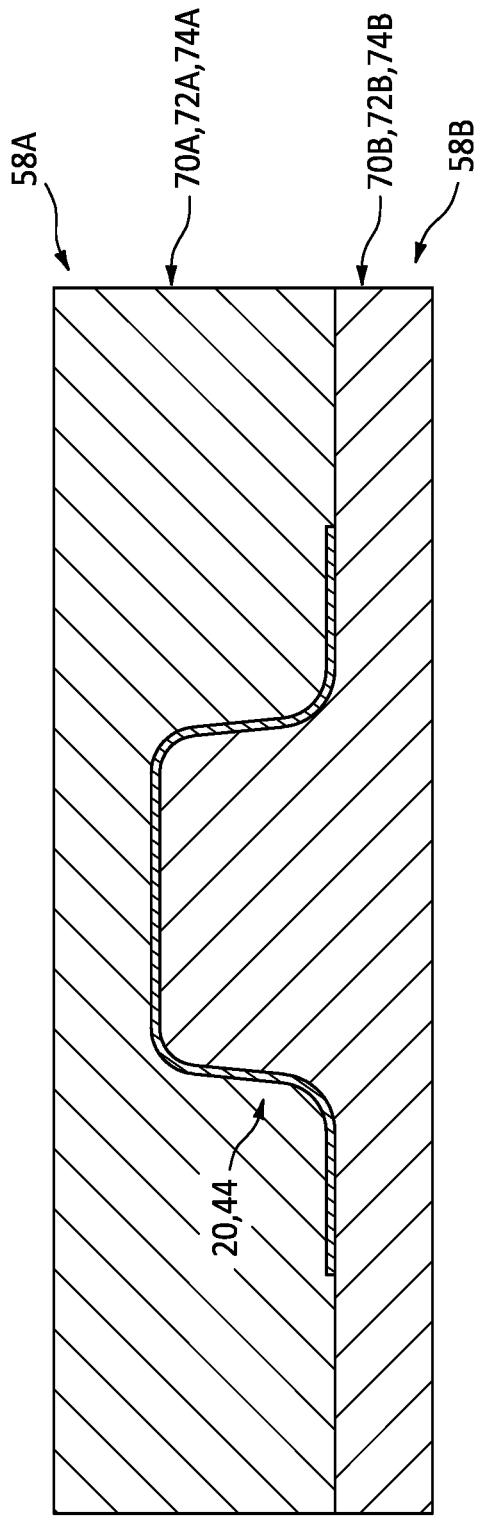
FIG. 6A is a cross-sectional illustration of a first thermoplastic composite structure between respective top and bottom inserts at a longitudinal position corresponding to line A-A in FIG. 1.
Figure 6B:
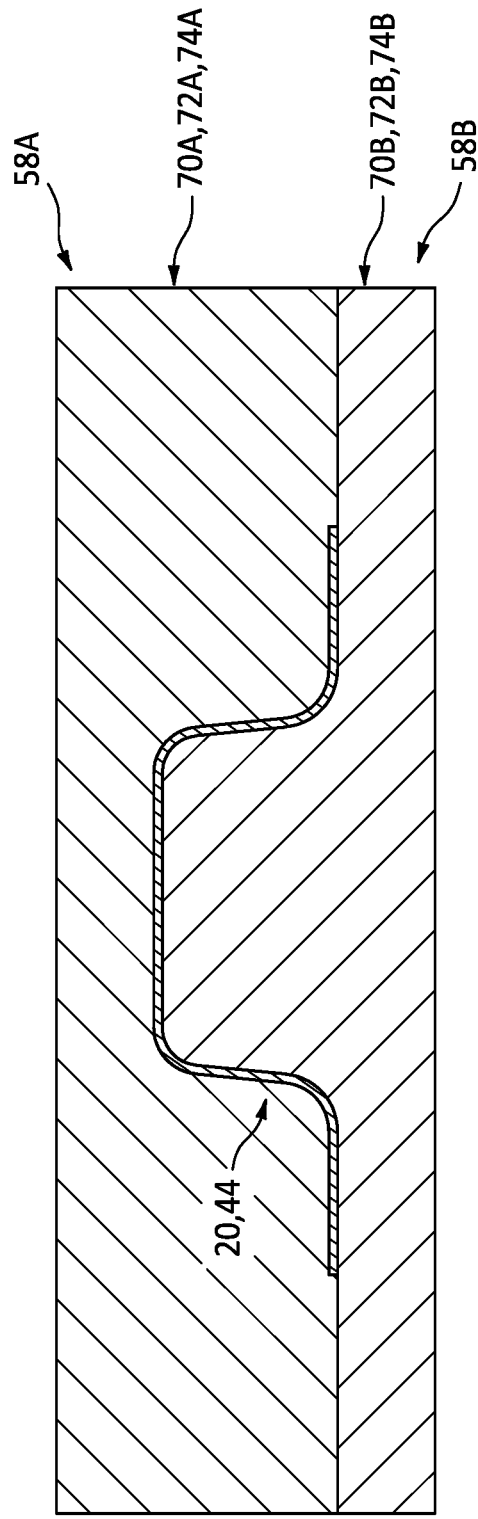
FIG. 6B is a cross-sectional illustration of the first thermoplastic composite structure between respective top and bottom inserts at a longitudinal position corresponding to line B-B in FIG. 1.
Figure 8A:
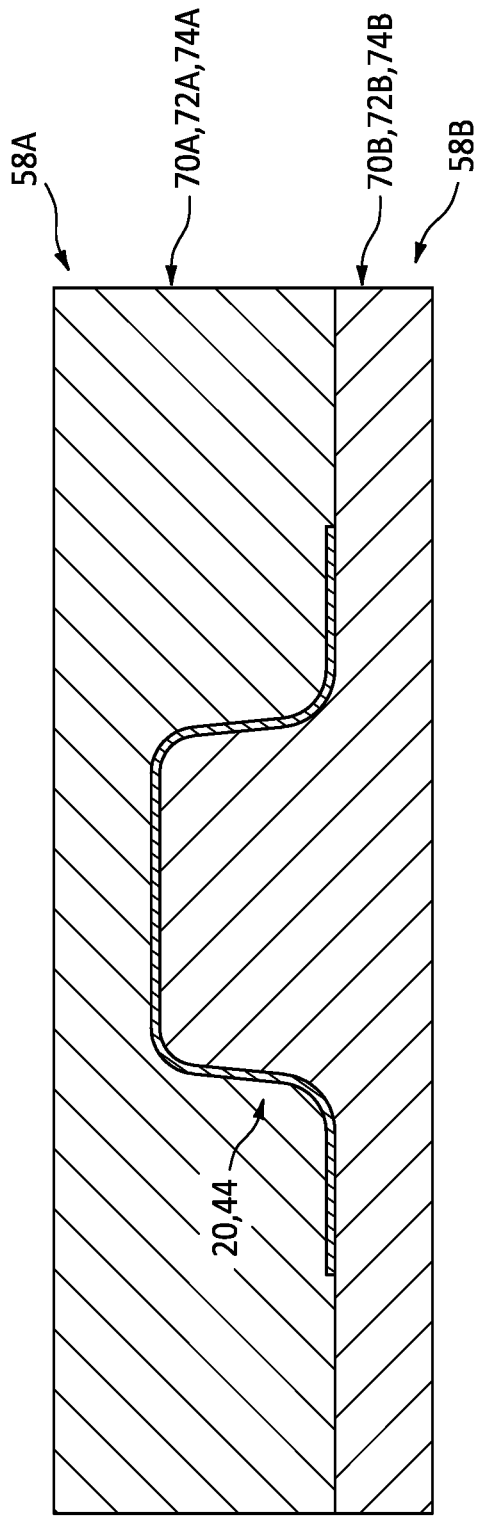
FIG. 8A is a cross-sectional illustration of a third thermoplastic composite structure between respective top and bottom inserts at a longitudinal position corresponding to line A-A in FIG. 1.
Figure 8B:
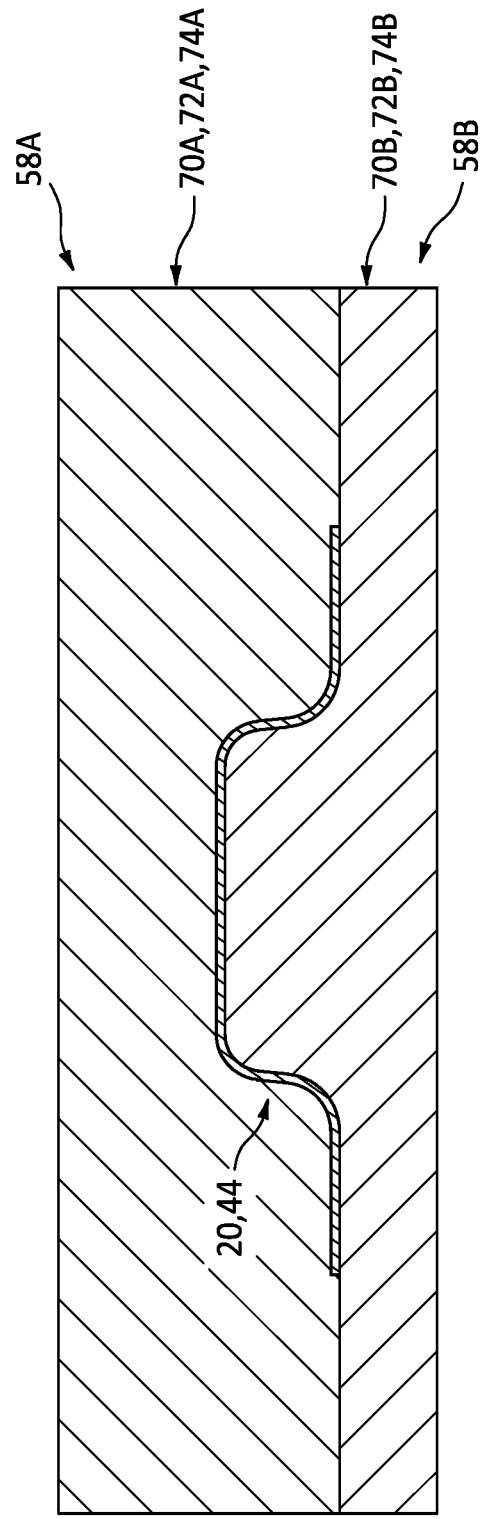
FIG. 8B is a cross-sectional illustration of the third thermoplastic composite structure between respective top and bottom inserts at a longitudinal position corresponding to line B-B in FIG. 1.

In step 506, the tooling 58 is provided based on a configuration (e.g., geometry, dimensions, etc.) of the first section 44A and/or the second section 44B (e.g., the thermoplastic components) and tailored design of the joint configuration. For example, a variety of different sets of top inserts and/or a variety of different sets of bottom inserts may be available for use with the joining system 54. These different sets of tooling inserts may be designed for mating with/conforming to support member sections 44 (or other thermoplastic components) with different configurations which may utilize (e.g., require) a unique joint design to join the components. The tooling inserts 70A, 72A, 74A and 70B, 72B, 74B of FIGS. 6A and 6B, for example, are configured for joining together support member sections 44 having a uniform geometry with uniform dimensions, for example, longitudinally along their lengths, laterally along their widths and/or vertically along their heights. The tooling inserts 70A, 72A, 74A and 70B, 72B, 74B of FIGS. 7A and 7B are configured for joining together support member sections 44 having a uniform geometry with variable dimensions (e.g., thickness), for example, along their longitudinally lengths. Of course, the dimensions may also vary or be uniform laterally along the widths of the support member sections 44 and/or vertically along the heights of the support member sections 44. The tooling inserts 70A, 72A, 74A and 70B, 72B, 74B of FIGS. 8A and 8B are configured for joining together support member sections 44 having a variable geometry (e.g., shape) along their longitudinally lengths. Of course, the geometry may also vary or be uniform laterally along the widths of the support member sections 44 and/or vertically along the heights of the support member sections 44. The present disclosure, however, is not limited to the foregoing exemplary support member (e.g., thermoplastic component) nor tooling insert configurations.

Once the tooling inserts 70A, 72A, 74A, 70B, 72B and 74B to be used are selected, these tooling inserts 70A, 72A, 74A, 70B, 72B and 74B are configured with the tooling bases 64A, 66A, 68A, 64B, 66B and 68B of FIG. 3. For example, the top inserts 70A, 72A and 74A are respectively arranged with and attached to the top bases 64A, 66A and 68A, where one or more or all of the top bases 64A, 66A and 68A may already be arranged with and attached to the top press device 60A. The bottom inserts 70B, 72B and 74B are respectively arranged with and attached to the bottom bases 64B, 66B and 68B, where one or more or all of the bottom bases 64B, 66B and 68B may already be arranged with and attached to the bottom press device 60B.

Figure 9:
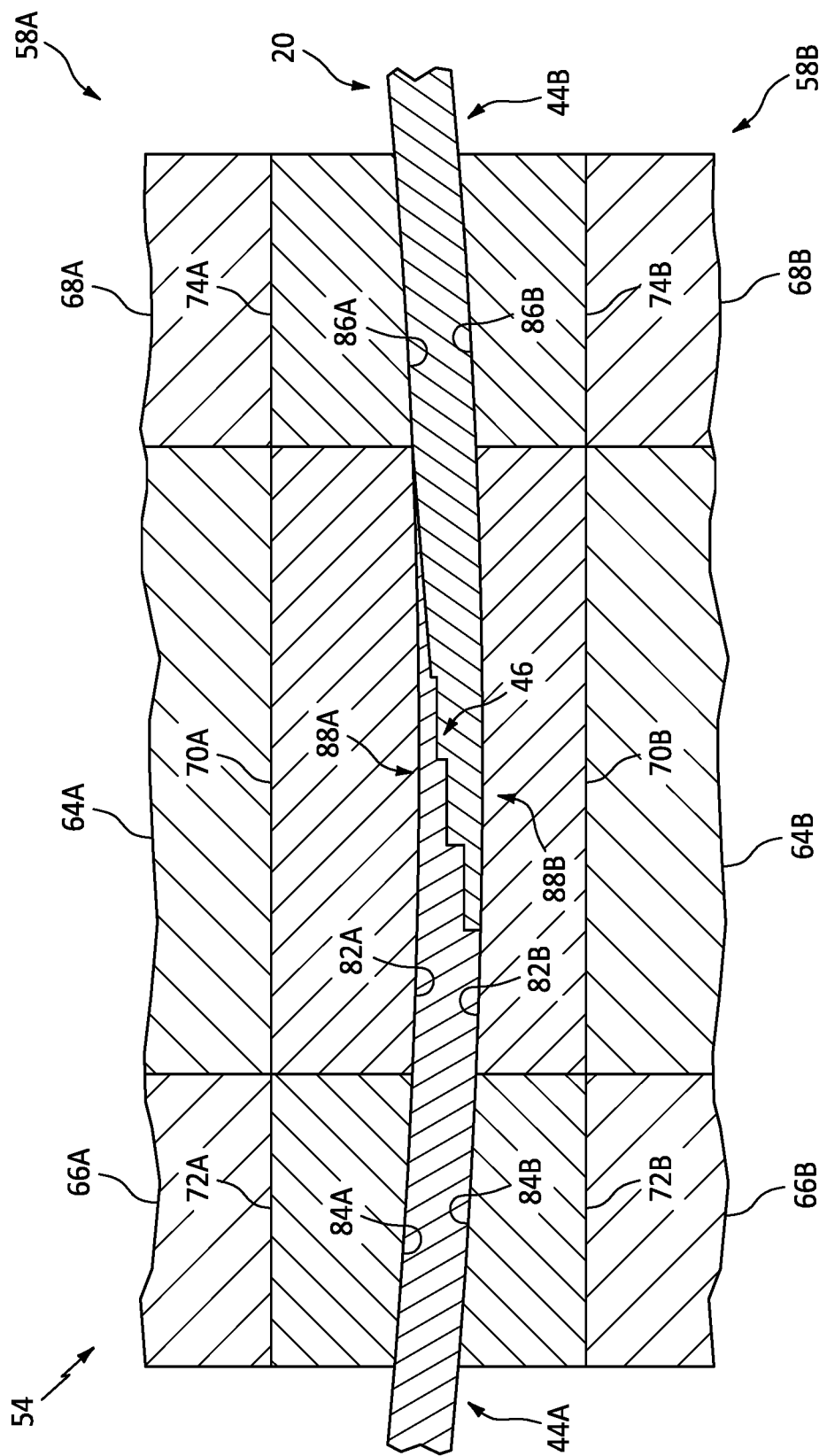
FIG. 9 is a schematic illustration of the thermoplastic composite structure pressed between top tooling and bottom tooling.

In step 508, the support member sections 44 (e.g., the thermoplastic components) are arranged (e.g., aligned) together between the tooling 58. For example, referring to FIG. 9, an end portion 88A of the first section 44A may be abutted against, overlap and/or otherwise arranged with an end portion 88B of the second section 44B. The first section end portion 88A and the second section end portion 88B may each be intermittently (e.g., step) tapered to provide a stepped lap joint between the support member sections 44; e.g., at the interface 46. These end portions 88A and 88B (generally referred to as "88") may alternatively each be continuously tapered to provide a scarf joint between the support member sections 44. The end portions 88 may still alternatively be configured with a lap joint, a double stepped lap joint, a double scarf joint or any other type of joint between the support member sections 44.

The assembly of the support member sections 44 is disposed vertically between the top tooling 58A and the bottom tooling 58B. A longitudinal center of the joint between the support member sections 44 may be longitudinally aligned with a longitudinal center of the intermediate tooling components 64A and 70A, 64B and 70B. The intermediate tooling components 64A and 70A, 64B and 70B may also completely longitudinally overlap the joint between the support member sections 44. The first side tooling 66A and 72A, 66B and 72B may thereby be disposed to a longitudinal first side of the joint between the support member sections 44. The second side tooling 68A and 74A, 68B and 74B may be disposed to a longitudinal second side of the joint between the support member sections 44.

In step 510, the support member sections 44 (e.g., the thermoplastic components) are joined together in the 3-D joint section to form the support member 20 (e.g., the thermoplastic structure) from discrete components. The pressure device 56 of FIG. 3, for example, may press (a) the assembly of the support member sections 44 between the top tooling 58A and the bottom tooling 58B and (b) the first section 44A against the second section 44B at the joint therebetween. More particularly, the top press device 60A and the bottom press device 60B may move the tooling 58 into contact with the support member sections 44. The top press device 60A and the bottom press device 60B may then press (e.g., squeeze) the top tooling 58A and the bottom tooling 58B against the support member sections 44. The pressure device 56 and its press devices 60A and 60B may thereby exert a compressive pressure force onto the assembly of the support member sections 44 through the top tooling 58A and the bottom tooling 58B. This compressive pressure force may be between 500 psi and 3000 psi. However, in other embodiments, the compressive pressure force may be less than 500 psi or greater than 3000 psi.

While the compressive pressure force is being applied, at least a portion of the assembly of the support member sections 44 at and/or about the joint is heated to an elevated temperature by the top heater 76A and/or the bottom heater 76B. This elevated temperature may be between 700° Fahrenheit and 800° Fahrenheit. However, in other embodiments, the elevated temperature may be less than 700° Fahrenheit or greater than 800° Fahrenheit depending upon melting point of the specific thermoplastic material 52 forming the support member sections 44. A combination of the heating of the support member sections 44 at and/or about the joint and the pressure applied by the pressure device 56 may facilitate fusing/consolidating of the thermoplastic materials 52 of the support member sections 44 together at the interface 46 to provide a fused connection between the support member sections 44. These fused support member sections 44 may thereby now form a single, consolidated body; here, the support member 20. Additional and/or alternative fusing parameters (e.g., temperatures, pressures, etc.) may be found in U.S. Pat. No. 11,084,228 assigned to the assignee of the present disclosure, and the disclosure of the '228 patent is hereby incorporated herein by reference in its entirety.

During the joining step 510, the side tooling components 66A and 72A, 68A and 74A, 66B and 72B, 68B and 74B may be unheated (except indirectly through the intermediate tooling components 64A and 64B). A temperature of a portion of the first section 44A held by the first side tooling components 66A and 72A, 66B and 72B and a temperature of a portion of the second section 44B held by the second side tooling components 68A and 74A, 68B and 74B may thereby be lower than the temperature at the interface 46 between the support member sections 44. While these temperatures may be lower, the temperature may still be elevated enough to soften the thermoplastic material 52. The unheated side tooling components 66A and 72A, 68A and 74A, 66B and 72B, 68B and 74B may thereby be provided to support the support member sections 44 such that the portions of the support member sections 44 adjacent the interface 46 do not deform.

In step 512, the support member 20 (e.g., the thermoplastic structure) is cooled at the joint. More particular, while still under full (or partial) pressure from the pressure device 56, the top cooler 78A and/or the bottom cooler 78B cool (e.g., transfer heat energy out of) the support member 20. The support member 20 may be cooled to room temperature. Alternatively, the support member 20 may be cooled to a temperature that is above room temperature, but is below a temperature where the support member 20 is soft and/or compliant.

In step 514, the support member 20 (e.g., the thermoplastic structure) is removed from the joining system 54. The compressive pressure force exerted by the pressure device 56, for example, is relieved and the pressure device 56 is subsequently opened to release the support member 20 from the tooling 58.

Figure 10:
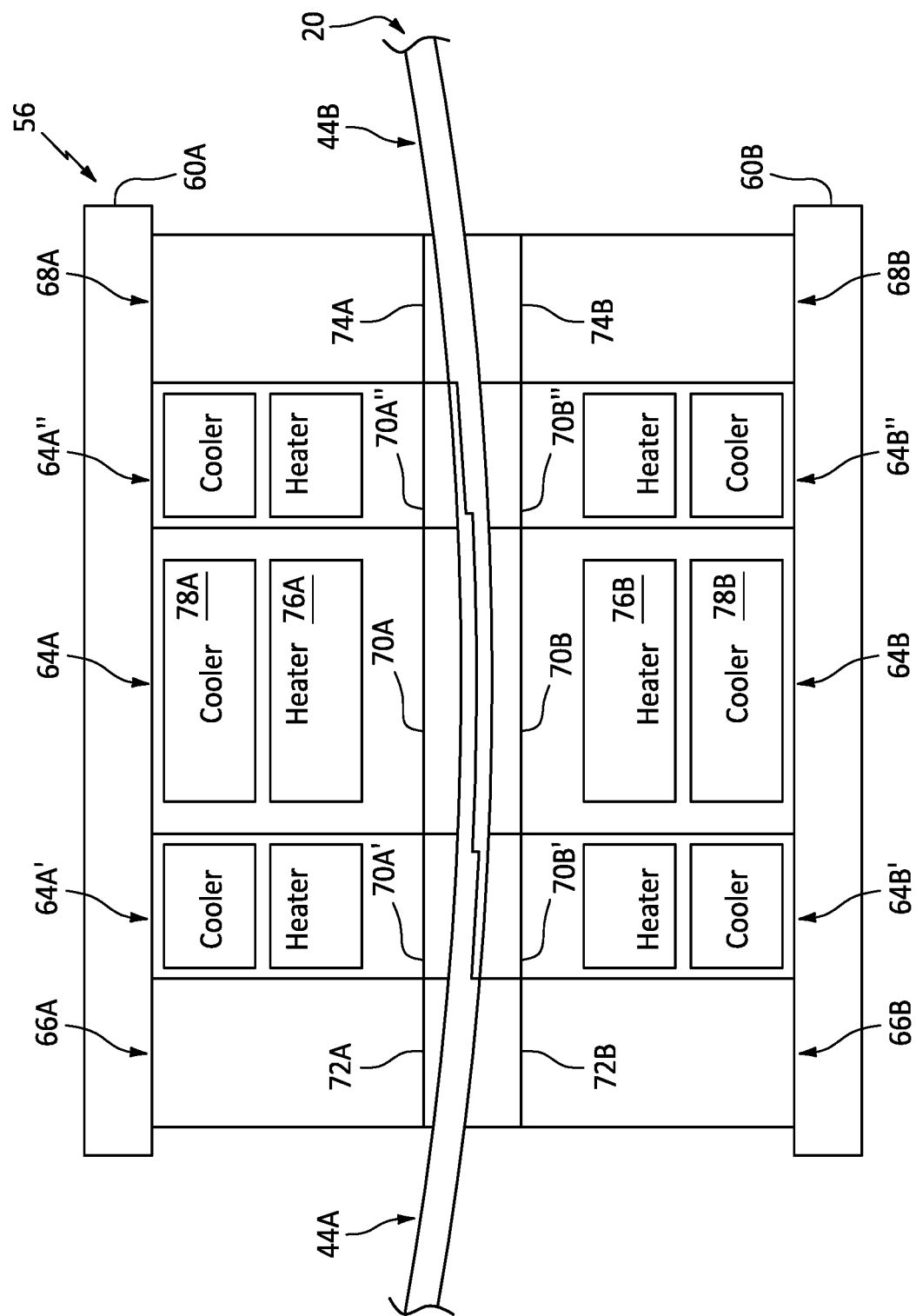
FIG. 10 is a schematic illustration of the joining system with additional tooling components.

In some embodiments, referring to FIG. 10, the joining system 54 may include one or more additional heated and/or cooled (e.g., intermediate) tooling bases 64A', 64A", 64B' and 64B". Each of these additional tooling bases 64A', 64A", 64B' and 64B" may have a similar configuration as described above with respect to the intermediate base 64A, 64B. For example, each additional tooling base 64A', 64A", 64B', 64B" may include its own heater and/or its own cooler. Each additional tooling base 64A', 64A", 64B', 64B" is also paired with an additional tooling insert 70A', 70A", 70B', 70B". In some embodiments, the tooling bases 64A', 64A", 64B' and 64B" may alternatively be modular so as to collectively form a common heater and/or a common cooler. These additional tooling bases 64A', 64A", 64B' and 64B" may be selectively included in order to accommodate, for example, a longer interface 46 with varying thicknesses (e.g., utilizing a different heating/cooling input) between the support member sections 44 (e.g., the thermoplastic components).

Figure 11:
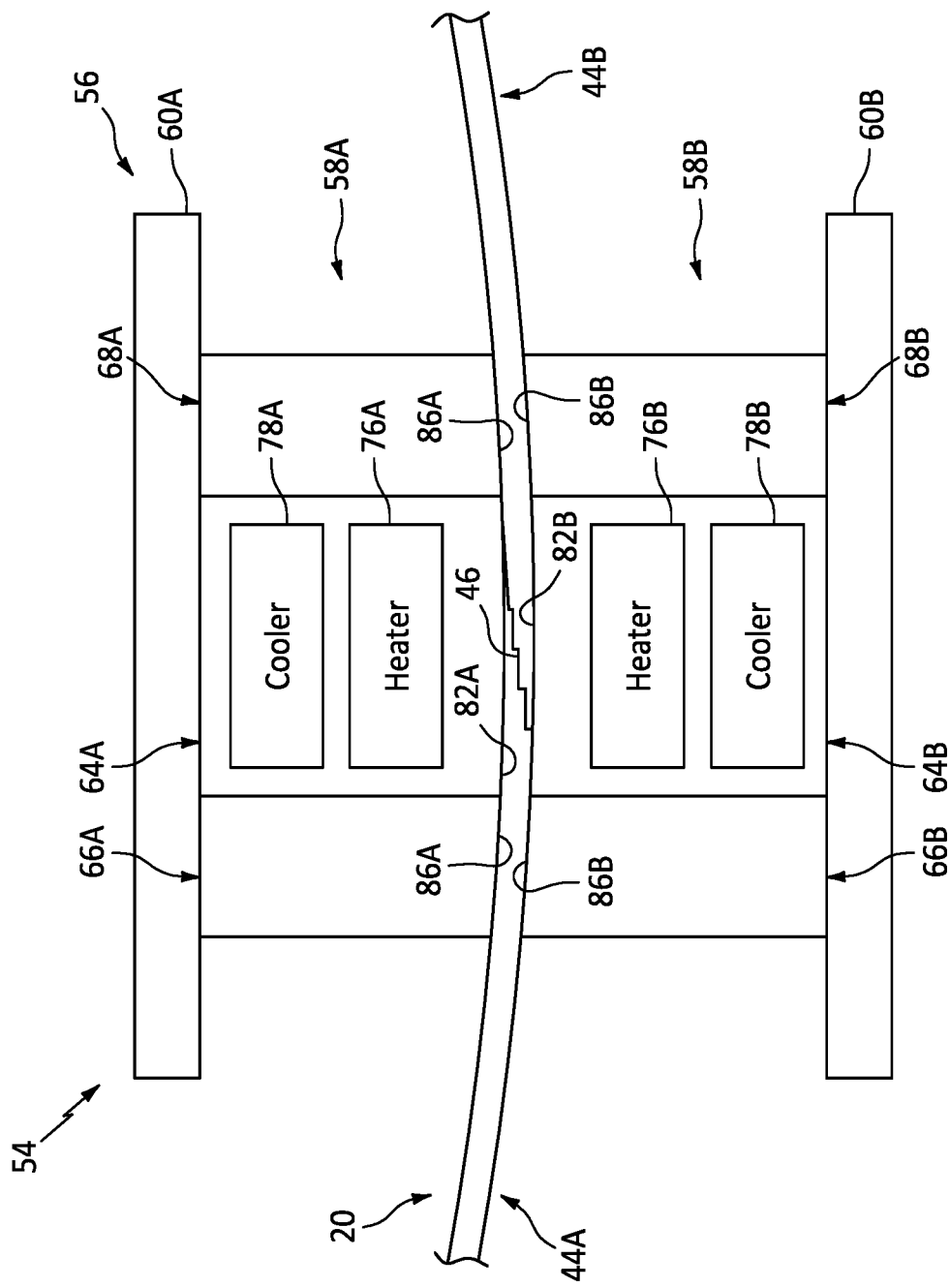
FIG. 11 is a schematic illustration of the joining system of FIG. 3 configured without any tooling inserts.
Figure 12:
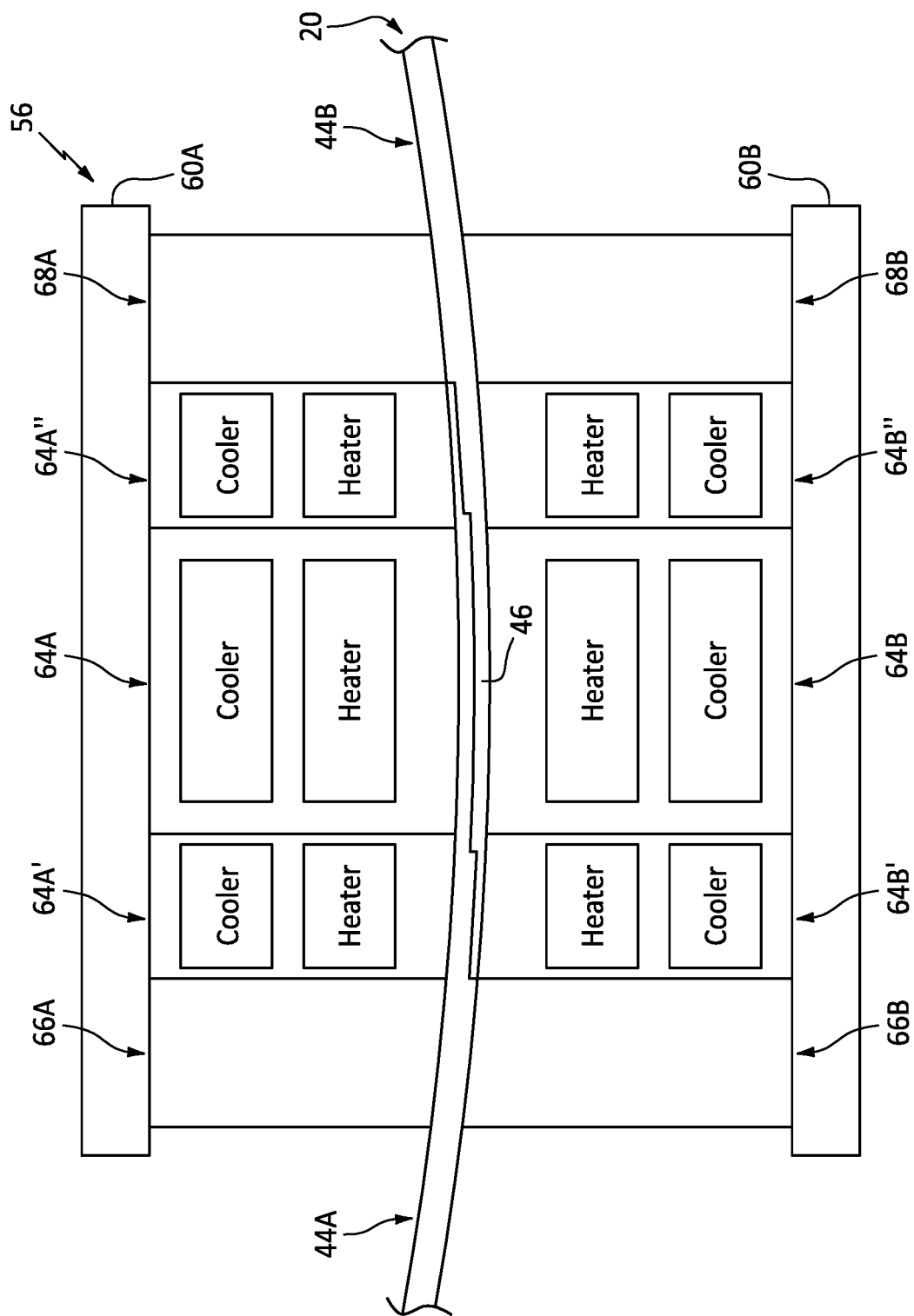
FIG. 12 is a schematic illustration of the joining system of FIG. 10 configured without any tooling inserts.

In some embodiments, referring to FIGS. 11 and 12, the joining system 54 may be configured without the top inserts and/or the bottom inserts. In such embodiments, the top bases 64A, 64A', 64A", 66A and 68A and the bottom bases 64B, 64B', 64B", 66B and 68B are configured to mate with and conform to the support member sections 44 (e.g., the thermoplastic components) as described above with the tooling inserts. The top inserts therefore are functionally integrated into the top bases 64A, 64A', 64A", 66A and 68A, and the bottom inserts are functionally integrated into the bottom bases 64B, 64B', 64B", 66B and 68B.

Figure 13:
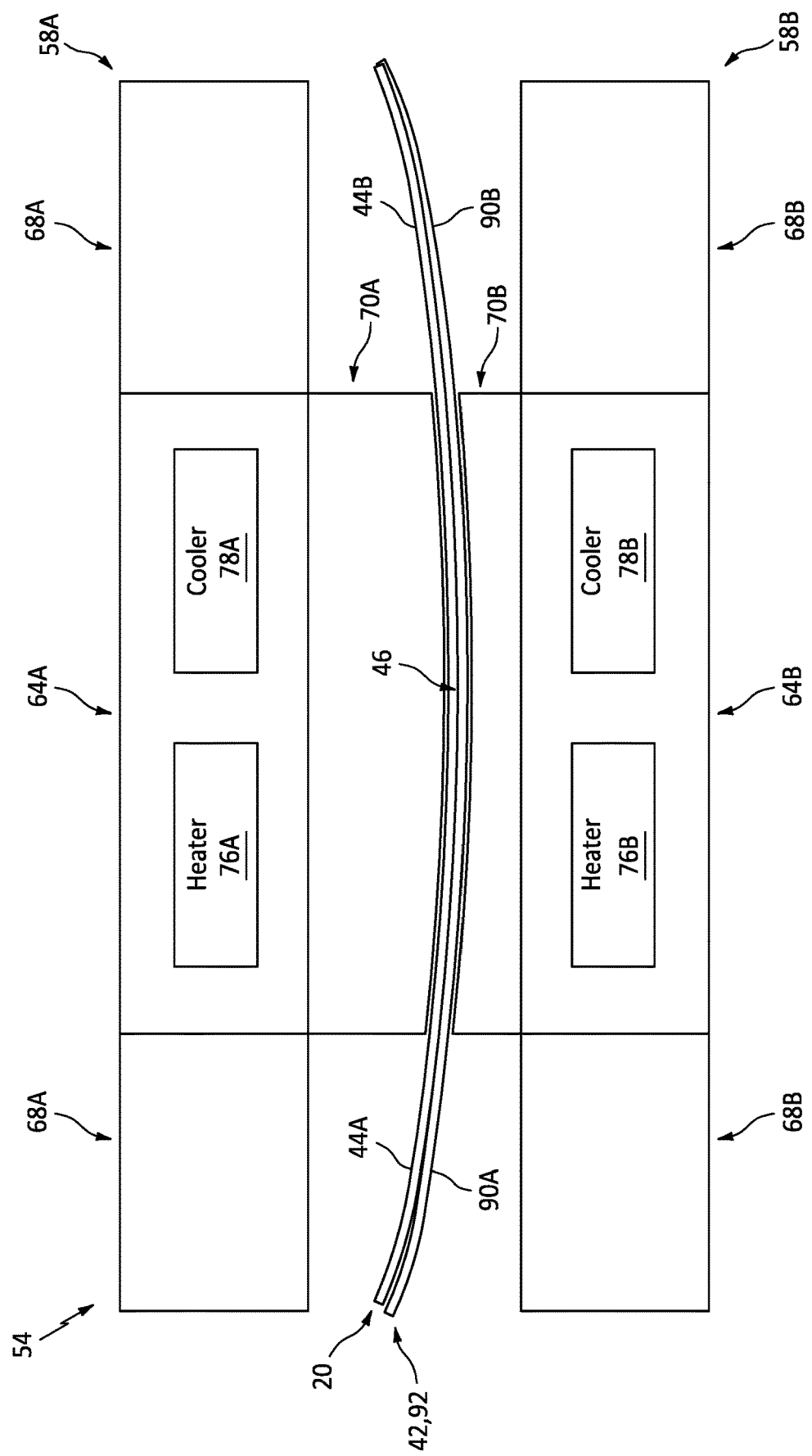
FIG. 13 is a schematic illustration of a portion of the joining system configured for forming another thermoplastic structure with a support member and an exterior skin.

In some embodiments, referring to FIG. 13, each support member section 44 may be paired with another thermoplastic component such as, but not limited to, an exterior skin section 90A, 90B (generally referred to as "90"). With such an arrangement, following the joining, the joined support member sections 44 may collectively form the support member 20 and the joined exterior skin sections 90 may collectively form a thermoplastic exterior skin 92.

Figure 14:
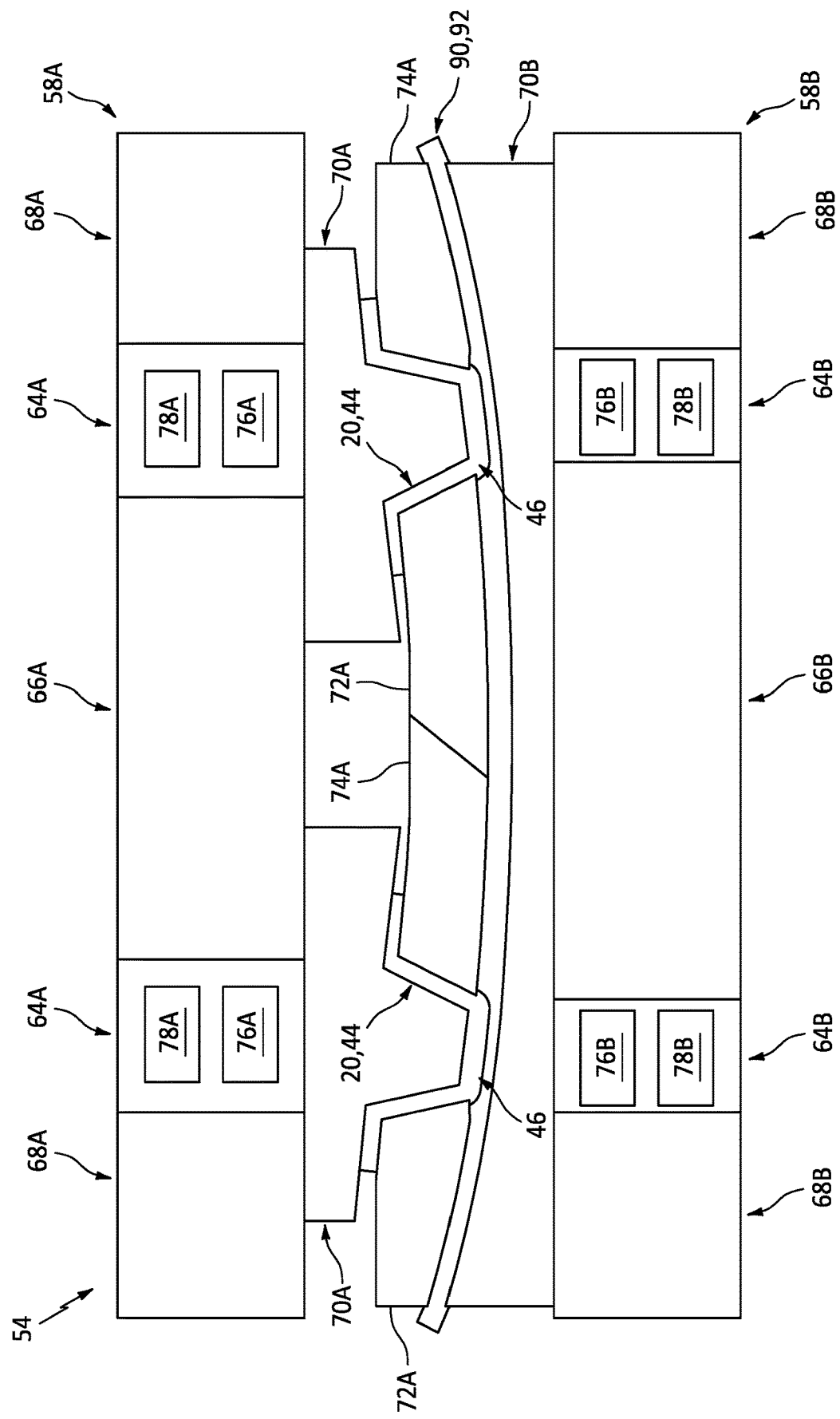
FIG. 14 is a schematic illustration of a portion of the joining system configured for forming still another thermoplastic composite structure with multiple stiffening members and an exterior skin.

In some embodiments, referring to FIG. 14, the joining system 54 may be configured for joining a plurality of the support members 20 (or support member sections 44) to another thermoplastic component such as, but not limited to, the exterior skin 92 (or exterior skin section 90).

Figure 15B:
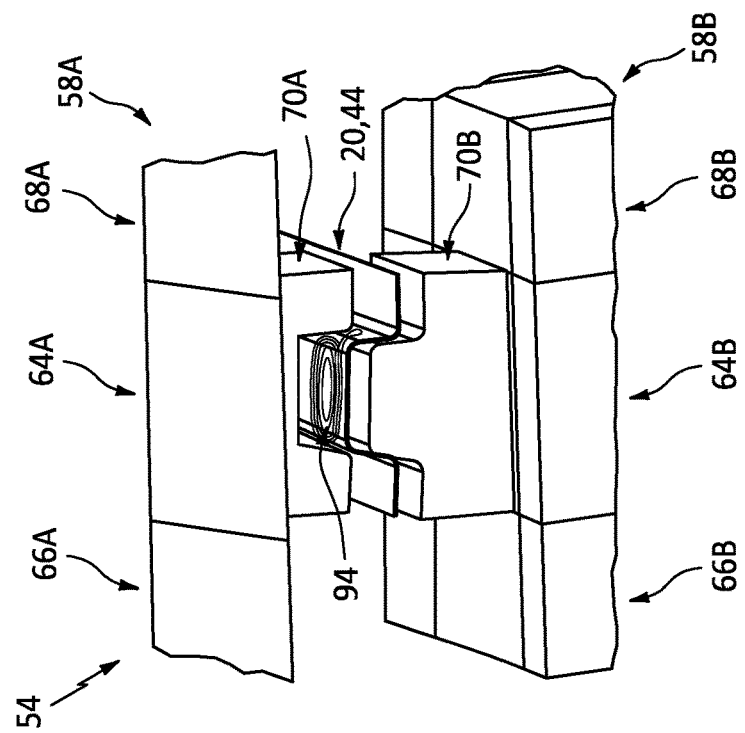
FIG. 15B is a perspective illustration of a portion of the joining system configured for joining the repair patch with the parent substrate member portion.
Figure 15A:
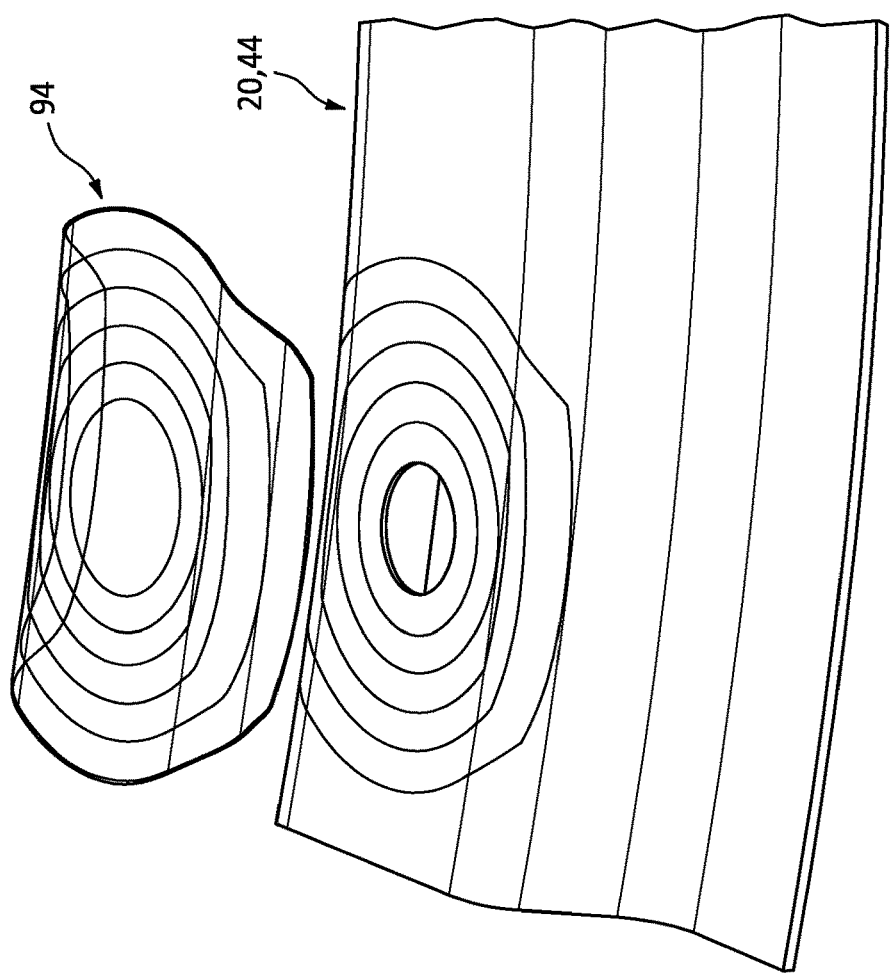
FIG. 15A is a perspective illustration of a repair patch with a portion of a support member.

In some embodiments, referring to FIGS. 15A and 15B, the joining system 54 may be configured for joining a thermoplastic patch 96 to another thermoplastic component such as the support member 20 (or support member section 44).

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A joining method, comprising:
arranging a first thermoplastic component joint section and a second thermoplastic component joint section vertically between first tooling and second tooling, an end portion of the second thermoplastic component joint section abutted longitudinally against and vertically against an end portion of the first thermoplastic component joint section at a joint area, and the end portion of the second thermoplastic component joint section vertically overlapping and longitudinally overlapping the end portion of the first thermoplastic component joint section at the joint area;
joining the first thermoplastic component joint section to the second thermoplastic component joint section to provide a unitized thermoplastic structure, the joining comprising
pressing the first thermoplastic component joint section vertically against the second thermoplastic component joint section at the joint area between the first tooling and the second tooling using a pressure device; and
heating the first thermoplastic component joint section and the second thermoplastic component joint section at the joint area using a first heater configured with the first tooling; and
cooling the unitized thermoplastic structure at the joint area using a first cooler configured with the first tooling.

2. The joining method of claim 1, wherein the first heater is disposed within the first tooling.

3. The joining method of claim 1, wherein the heating further comprises heating the first thermoplastic component joint section and the second thermoplastic component joint section using a second heater configured with the second tooling.

4. The joining method of claim 1, wherein the first cooler is disposed within the first tooling.

5. The joining method of claim 1, wherein the cooling further comprises cooling the unitized thermoplastic structure using a second cooler configured with the second tooling.

6. The joining method of claim 1, wherein
the pressure device includes a first press device and a second press device; and
the first tooling and the second tooling are arranged between the first press device and the second press device, the first press device engages the first tooling, and the second press device engages the second tooling.

7. The joining method of claim 1, wherein
the first tooling includes a tooling base and a tooling insert;
the tooling base is arranged with the first heater and the first cooler; and the tooling insert has a geometry that conforms to a geometry of an assembly of the first thermoplastic component joint section and the second thermoplastic component joint section, and the tooling insert is between and contacts the tooling base and the assembly.

8. The joining method of claim 7, wherein
the first tooling further includes a second tooling base and a second tooling insert;
the second tooling base is adjacent the tooling base; and
the second tooling insert is adjacent the tooling insert, the second tooling insert has a geometry that conforms to a geometry of at least the first thermoplastic component joint section, and the second tooling insert is between and contacts the second tooling base and at least the first thermoplastic component joint section.

9. The joining method of claim 8, wherein the second tooling base is configured without at least one of a heater or a cooler.

10. The joining method of claim 8, wherein the second tooling base is configured with at least one of a second heater or a second cooler.

11. The joining method of claim 1, wherein
the first tooling comprises a tooling base;
the tooling base is arranged with the first heater and the first cooler; and
the tooling base has a geometry that conforms to a geometry of an assembly of the first thermoplastic component joint section and the second thermoplastic component joint section, the tooling base is between a member of the pressure device and the assembly, and the tooling base contacts the assembly.

12. The joining method of claim 11, wherein
the first tooling further comprises a second tooling base;
the second tooling base is adjacent the tooling base; and
the second tooling base has a geometry that conforms to a geometry of at least the first thermoplastic component joint section, the second tooling base is between the member of the pressure device and at least the first thermoplastic component joint section, and the second tooling base contacts at least the first thermoplastic component joint section.

13. The joining method of claim 12, wherein the second tooling base is configured without at least one of a heater or a cooler.

14. The joining method of claim 12, wherein the second tooling base is configured with at least one of a second heater or a second cooler.

15. The joining method of claim 1, wherein a cross-sectional geometry of an assembly of the first thermoplastic component joint section and the second thermoplastic component joint section changes as the assembly extends along the first tooling.

16. The joining method of claim 1, wherein a dimension of an assembly of the first thermoplastic component joint section and the second thermoplastic component joint section changes as the assembly extends along the first tooling.

17. A system for joining a first thermoplastic component to a second thermoplastic component, the system comprising:
a pressure device;
first tooling configured with a first tooling geometry that conforms to a first side geometry of an assembly of the first thermoplastic component and the second thermoplastic component, the first tooling including a first surface configured to abut against the first thermoplastic component and the second thermoplastic component, and the first tooling comprises a first heater and a first cooler; and
second tooling configured with a second tooling geometry that conforms to a second side geometry of the assembly, the second tooling including a second surface configured to abut against the first thermoplastic component and the second thermoplastic component, and the second surface longitudinally overlapping and vertically opposite the first surface, wherein one of the first surface and the second surface comprises a concave surface, and the other one of the first surface and the second surface comprises a convex surface adapted to project vertically into a groove formed by the concave surface;
the system configured to join a first joint section of the first thermoplastic component to a second joint section of the second thermoplastic component to provide a unitized thermoplastic structure, wherein during the joining the system is configured to
press the first joint section of the first thermoplastic component vertically against the second joint section of the second thermoplastic component between the first tooling and the second tooling using the pressure device; and
heat the first joint section of the first thermoplastic component and the second joint section of the second thermoplastic component using the first heater; and
the system further configured to cool the unitized thermoplastic structure using the first cooler.

18. The system of claim 17, wherein
the first tooling includes a tooling base and a tooling insert;
the tooling base includes the first heater and the first cooler; and
the tooling insert provides the first tooling with the geometry that conforms to the first side geometry of the assembly, and the tooling insert is configured to be between and contact the tooling base and the assembly.

19. The system of claim 17, wherein
the first tooling comprises a tooling base;
the tooling base includes the first heater and the first cooler; and
the tooling base provides the first tooling with the geometry that conforms to the first side geometry of the assembly, the tooling base is configured to be between a member of the pressure device and the assembly, and the tooling base is configured to contact the assembly.

20. A joining method, comprising:
selecting a tooling insert from a set of a plurality of different tooling inserts based on a configuration of at least one of a first thermoplastic component and a second thermoplastic component;
mating the tooling insert with a tooling base to provide first tooling, the tooling base configured with a first heater and a first cooler;
arranging a first joint section of the first thermoplastic component and a second joint section of the second thermoplastic component between the first tooling and second tooling, the second joint section of the second thermoplastic component abutted against the first joint section of the first thermoplastic component;
joining the first joint section of the first thermoplastic component to the second joint section of the second thermoplastic component to provide a unitized thermoplastic structure, the joining comprising pressing the first joint section of the first thermoplastic component against the second joint section of the second thermoplastic component between the tooling insert and the second tooling; and heating the first joint section of the first thermoplastic component and the second joint section of the second thermoplastic component using the first heater; and cooling the unitized thermoplastic structure using the first cooler.

* * * * *